United States Patent
Hier et al.

(10) Patent No.: US 7,163,234 B2
(45) Date of Patent: Jan. 16, 2007

(54) VEHICULAR CROSS CAR BEAM ASSEMBLY HAVING AN INTEGRAL AIR BAG INFLATOR

(75) Inventors: Michael J. Hier, Milford Township, MI (US); Todd DePue, Brighton, MI (US); Michael W. Cass, Lenox, MI (US); Robert J. Adams, Ypsilanti, MI (US); Glenn A. Cowelchuk, Chesterfield Township, MI (US)

(73) Assignee: Lear Corporation, Southfield, MI (US)

( * ) Notice: Subject to any disclaimer, the term of this patent is extended or adjusted under 35 U.S.C. 154(b) by 270 days.

(21) Appl. No.: 10/603,576

(22) Filed: Jun. 25, 2003

(65) Prior Publication Data

US 2004/0262897 A1    Dec. 30, 2004

(51) Int. Cl.
*B60R 21/205*    (2006.01)
(52) U.S. Cl. ............... 280/732; 280/728.2; 280/736
(58) Field of Classification Search .............. 280/732, 280/736, 741, 728.2
See application file for complete search history.

(56) References Cited

U.S. PATENT DOCUMENTS

| | | | |
|---|---|---|---|
| 3,817,552 A | * | 6/1974 | Knight et al. ............... 280/732 |
| 5,456,494 A | | 10/1995 | Witkovsky |
| 5,516,145 A | | 5/1996 | Williams et al. |
| 5,588,670 A | * | 12/1996 | Storey et al. ............... 370/468 |
| 5,630,616 A | | 5/1997 | McPherson |
| 5,664,801 A | | 9/1997 | Gray et al. |
| 5,685,598 A | | 11/1997 | Inoue et al. |
| 5,775,723 A | | 7/1998 | Dede et al. |
| 5,934,733 A | | 8/1999 | Manwaring |
| 5,951,087 A | | 9/1999 | Bittinger et al. |
| 6,126,195 A | * | 10/2000 | Lutz ........................... 280/737 |
| 6,296,277 B1 | | 10/2001 | Bittinger et al. |
| 6,325,440 B1 | | 12/2001 | Emmerich |
| 6,364,351 B1 | | 4/2002 | Hier et al. |
| 6,378,934 B1 | | 4/2002 | Palazzolo et al. |
| 2002/0038965 A1 | | 4/2002 | Palazzolo et al. |
| 2003/0025305 A1 | | 2/2003 | Speelman et al. |

FOREIGN PATENT DOCUMENTS

| | | |
|---|---|---|
| DE | 196 26 903 | 6/1997 |
| DE | 198 09 428 | 9/1999 |
| FR | 2 704 510 | 11/1994 |
| GB | 2 227 212 | 7/1990 |
| JP | 11-91503 | 4/1999 |

* cited by examiner

*Primary Examiner*—David R. Dunn
(74) *Attorney, Agent, or Firm*—MacMillan, Sobanski & Todd, LLC

(57) ABSTRACT

A cross beam assembly extends between side frame members of a vehicle and includes a beam having a hollow interior. The beam defines an opening formed therein. The assembly further includes an air bag inflator assembly having a source of pressurized gas for expelling gas to inflate an air bag. The inflator assembly is disposed within the hollow interior of the beam such that activation of the inflator assembly expels gas through said opening.

10 Claims, 3 Drawing Sheets

VEHICULAR CROSS CAR BEAM ASSEMBLY HAVING AN INTEGRAL AIR BAG INFLATOR

BACKGROUND OF THE INVENTION

This invention relates in general to motor vehicles, and in particular to vehicles having a structurally rigid cross car beam.

A conventional motor vehicle has an engine compartment towards its forward end and a passenger compartment rearward of the engine compartment. A laterally extending partition, commonly referred to as a bulkhead or firewall, is disposed between the engine compartment and the passenger compartment. Most passenger vehicles include an instrument panel positioned rearward of the firewall. The instrument panel is generally positioned underneath the windshield and attached to the frame of the vehicle rearward of the engine compartment. For example, the lateral ends of the instrument panel may be attached to the cowl sides of the frame of the vehicle. The instrument panel encloses various vehicle components, such as electrical and ventilation systems, audio systems, vehicle instrument gauges and displays, auxiliary compartments, and inflatable air bag modules.

It is becoming customary in modern vehicles to include a structural cross car beam extending the lateral length of the vehicle between the cowl sides. Opposing ends of the cross car beam are attached to frame members of the vehicle. A conventional cross car beam is a closed steel chamber that increases the structural integrity of the vehicle, offering resistance to impact sustained along the sides of the vehicle. The cross car beam is often positioned adjacent to or within the instrument panel. The cross car beam may support various vehicle components, such as glove compartments, audio/video players, steering column bracket, energy absorbing brackets, wiring harnesses, and air ventilation ducts.

Conventional cross car beams have a generally constant diameter or cross-sectional area extending substantially across its entire width to provide a sufficiently strong beam. To incorporate the cross car beam into the vehicle at its desired position, i.e., rearward of the firewall and below the windshield, the cross car beam often intrudes into the instrument panel and may therefore be incorporated therewith. In some vehicles, the cross car beam is preinstalled into the instrument as a modular assembly. The cross car beam and the instrument panel are then simultaneously attached to the vehicle. Because of the position of the cross car beam relative to the instrument panel, it is often difficult to accommodate the mounting space required for the various components installed in the instrument panel.

BRIEF SUMMARY OF THE INVENTION

This invention relates to a cross beam assembly for a vehicle. The cross beam assembly extends between side frame members of a vehicle and includes a beam having a hollow interior. The beam defines an opening formed therein. The assembly further includes an air bag inflator assembly having a source of pressurized gas for expelling gas to inflate an air bag. The inflator assembly is disposed within the hollow interior of the beam such that activation of the inflator assembly expels gas through said opening.

Various objects and advantages of this invention will become apparent to those skilled in the art from the following detailed description of the preferred embodiment, when read in light of the accompanying drawings.

DETAILED DESCRIPTION OF THE INVENTION

Figure 1:
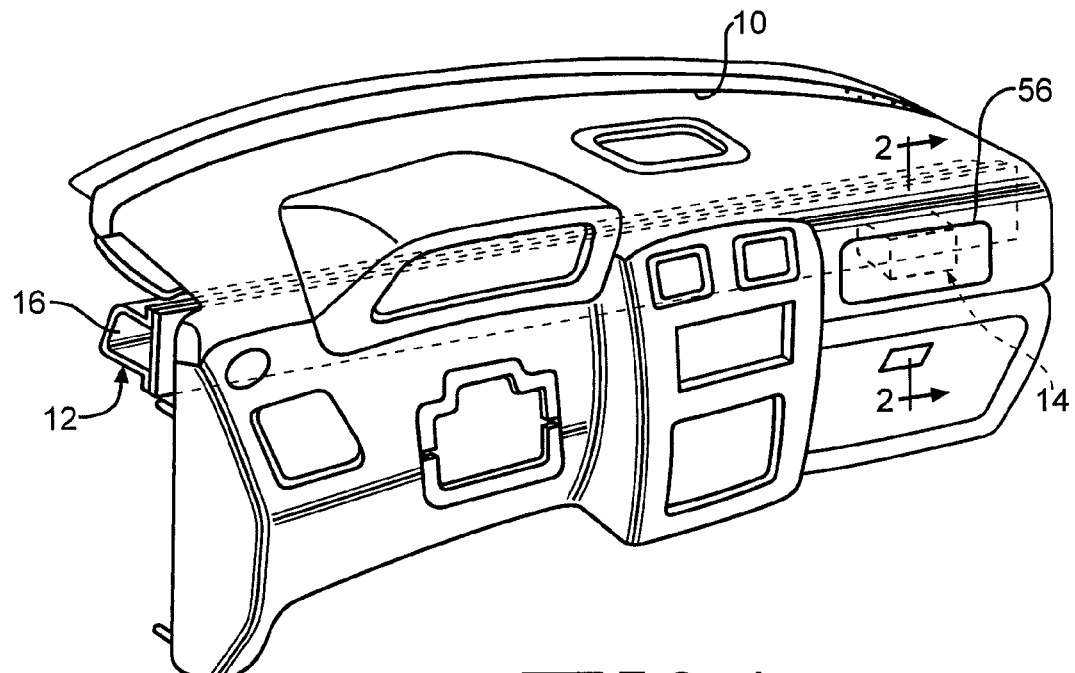
FIG. 1 is a perspective view of an instrument panel and first embodiment of a cross car beam assembly in accordance with the present invention.

Referring now to the drawings, there is illustrated in FIG. 1, an instrument panel 10 and a cross car beam assembly, indicated generally at 12 in accordance with the present invention. As will be discussed in detail below, the cross car beam assembly 12 includes an air bag inflator assembly 14 integrally mounted with cross car beam 16 of the assembly 12. This arrangement provides increased space in the instrument panel for other components, and may also help reduce the weight and cost of the instrument panel 10 and/or cross car beam assembly 12. This arrangement may also permit shorter depth instrument panels.

The instrument panel 12 is generally positioned underneath the windshield of the vehicle and rearward of the vehicle firewall. The instrument panel 10 generally extends along the entire width of the interior of the passenger compartment of the vehicle. The instrument panel 10 can be attached to the vehicle frame by any suitable manner. For example, the ends and rear portion of the instrument panel 10 can be directly attached to portions of the vehicle frame. The instrument panel 10 can have any desired shape and can house various components, such as electrical and ventilation systems, audio systems, vehicle instrument gauges and displays, and auxiliary compartments.

The cross car beam assembly 12 generally includes the elongated hollow beam 16 and the air bag inflator assembly 14. The beam 16 preferably extends laterally across the interior of the passenger compartment. The ends of the beam 16 can be attached to the vehicle frame, such as at the cowl sides. Alternatively, the beam 16 can be attached to the instrument panel 10. The beam 16 is preferably made of a structurally rigid material, such as steel, that increases the structural integrity of the vehicle by offering resistance to impact sustained along the sides of the vehicle. The beam 16 helps prevent the sides of the vehicle from intruding into the interior of the passenger compartment.

Figure 2:
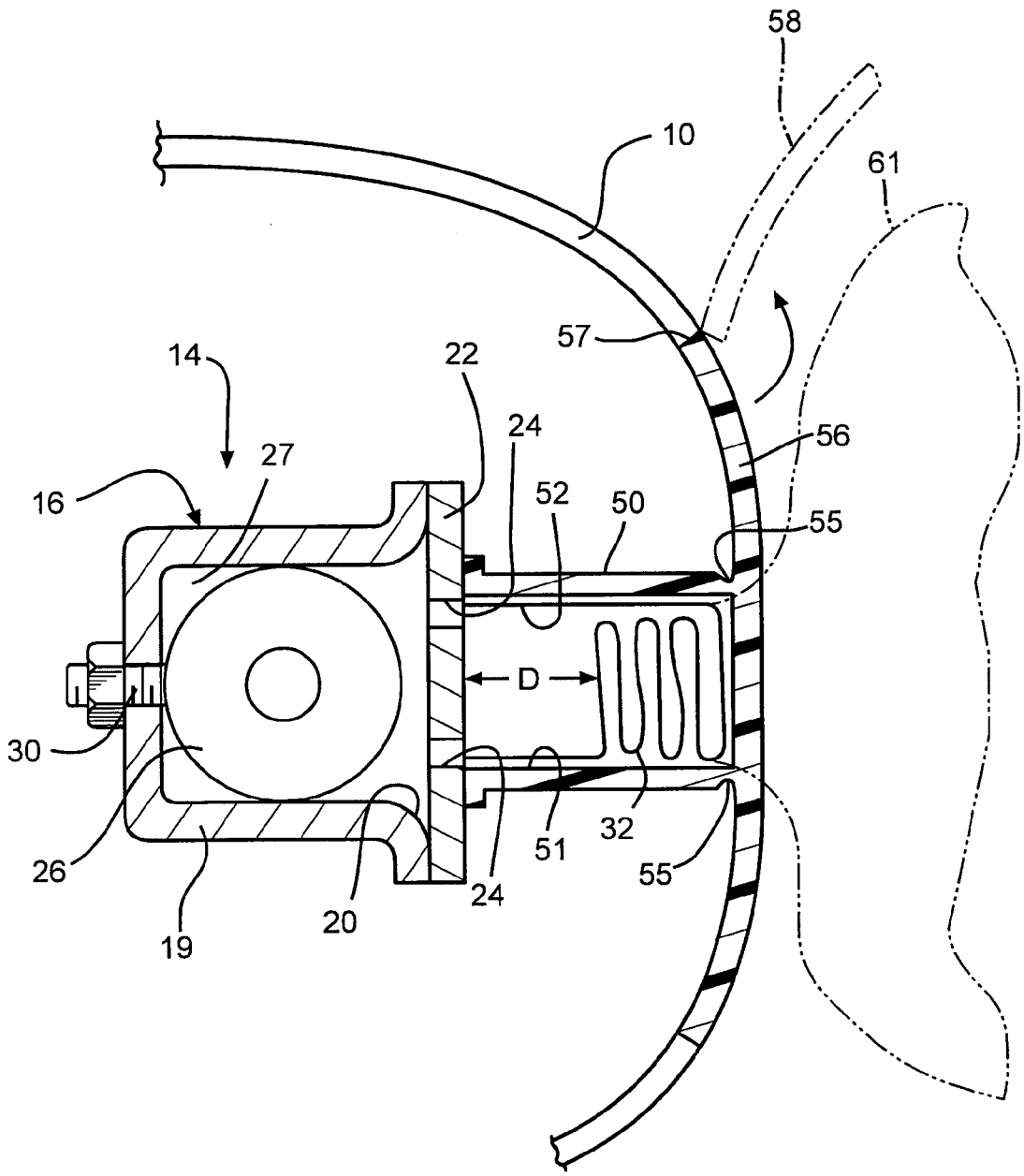
FIG. 2 is a sectional view of the cross car beam assembly taken along lines 2—2 of FIG. 1.

In a preferred embodiment, the beam 16 has a generally constant cross-sectional shape along its length to minimize bending and/or collapsing upon itself. However, it should be understood that the beam 16 is not limited to having a constant cross-sectional about its length, and may be formed with slight bends and/or having differing cross-sectional widths and diameters. The beam 16 may also have any suitable cross-sectional shape, such as circular, rectangular, or any unsymmetrical shape. The beam 16 may be formed from a single structure, such as a hollow tube, or may alternatively be formed by attachment of two or more structures. For example, as shown in FIG. 2, the beam 16 is formed by a stamped part 19 having a generally hat-shaped cross-sectional shape defining an open end 20. A generally flat plate 22 is attached to the open end 20 of the part 19. The part 19 and plate 22 form a closed loop generally rectangular cross-sectional shape. A closed loop cross-sectional shape is preferred due to its generally rigid nature for resisting a bending force. The plate 22 has one or more openings 24 formed therein, the reason for which will be explained below. The openings generally extend in a radial direction relative to an axis defined by the length of the beam 16.

Figure 3:
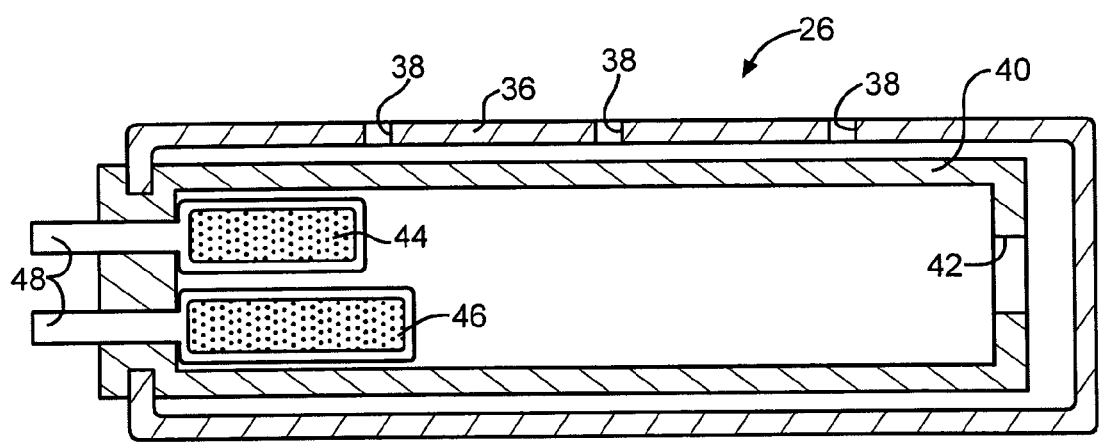
FIG. 3 is a schematic cross sectional view of an embodiment of an air bag inflator assembly which may be used with the cross car beam assembly.

In the embodiment of the cross car beam assembly 12 illustrated in FIG. 2, a separate inflator 26 is disposed within the interior 27 of the hollow beam 16. The inflator 26 can be mounted in the beam 16 by any suitable manner, such as by threaded fasteners 30. The inflator 26 can be any conventional air bag inflator mechanism capable of generating gases from a source of pressurized gas, such as for example, a solid propellant. The expelled gases are directed into a conventional air bag 32 for proper inflation of the air bag during an impact condition, such as a collision. The inflating air bag 32 helps protect the occupant of the passenger seat positioned rearward of the air bag inflator assembly 14. An example of a suitable inflator 26 is shown in FIG. 3.

The inflator 26 includes a separate canister including a cylindrical outer housing 36 having one or more apertures 38 formed therein. An inner sleeve 40 is disposed in the outer housing 36 and also includes one of more apertures 42. If desired, a rupture disk may be inserted in the apertures 42 which helps prevent contaminants from entering the interior of the sleeve 40. The inflator 26 preferably includes one or more propellant cartridges or chambers 44 and 46 which house propellant therein. The cartridges or chambers 44 and 46 may contain an explosive charge which excites the propellant, such as ammonium nitrate pellets which generally store pressurized gas in solid form until excited. It should be understood that any suitable conventional air bag propellant may be used. The inflator 26 includes initiators 48 which are electrically connected to a controller (not shown) for actuation and energizing of the inflator 26. Note that the beam 16 may include apertures (not shown) to provide a pathway for wiring electrically connecting the initiators 48 to the controller.

Commonly, the desired position of the beam 16 is positioned at a spaced apart relationship relative to the outer surface of the instrument panel facing the interior of the passenger compartment. Thus, the folded air bag 32 is spaced rearwardly from the inflator 26, such as by a distance D shown in FIG. 2. It is generally desirable to position the folded air bag 32 close to the outer surface of the instrument panel to provide proper deployment of the air bag 32. To direct the expelled gas from the inflator 26 to the air bag 32, an optional chute 50 is provided. The chute 50 can be mounted to the beam 16 and/or a portion of the instrument panel 10. Preferably, the folded air bag 32 is housed in the chute 50. As shown in FIG. 2, the air bag 32 includes an open end 52 facing forward towards the openings 24 of the beam 16. The open end 52 of the air bag 32 can be sealingly attached to the interior walls 51 of the chute 50. In the embodiment illustrated in FIG. 2, an air bag door 56 is integrally formed with the chute 50. The door 56 is attached to the instrument panel 10 via a hinge 57 or a tether (not shown). The door 56 covers the air bag 32 when in its non-deployed state. The door 56 is movable to a deployed position, indicated generally by broken lines 58 upon expansion of the air bag 32. The door 56 can be integrated into the chute 50 as shown in FIG. 2. Preferably, the door 56 is attached to the chute 50 by thin walled members 55 which break open to separate a portion of or the entire door 56 from the chute 50 upon deployment of the air bag 32. Alternatively, the door 56 can be integrally formed in the instrument panel 12 such as by a conventional break-away seam, as is commonly known in the art.

Upon detection of an impact condition in which the air bag 32 is to be deployed, a controller energizes one or both of the initiators 48, which in turn energizes the propellant within the respective chamber 44 and 46. Energizing of the propellant causes an expansion of gas within the interior of the sleeve 40 which is forced outwardly through the apertures 42 and the apertures 38 of the outer housing 36. As shown in FIG. 2, the expanding gas is directed into the interior 27 of the beam 16 and through the openings 24 into the interior of the chute 50. The expanding gases can be directed from the interior 27 of the beam 16 to the chute 50 by any suitable manner. Preferably, at least the ends of the beam 16 are capped so that the expanding gases are directed through the openings 24. More preferably, the interior 27 of the beam 16 is closed off adjacent the inflator 26 so that the inflator 26 is disposed in a generally small chamber within the interior of the beam 16. Alternatively, additional chutes or conduits can be formed between the apertures 38 of the inflator 26 and the opening 26 of the beam 16 to direct the expanding gases therebetween. Since the open ends of the air bag 32 are sealingly attached to the interior walls 51 of the chute 50, the expanding gases in the chute 50 are directed into the air bag 32. Expansion of the air bag 32 breaks the thin walled members 55 and forces the door 56 to its deployed position 58, thereby permitting release of the expanding air bag, as indicated generally by broken lines 61.

As stated before, it should be understood that any suitable conventional air bag inflator may be used for the inflator 26. The inflator 26 illustrated in FIG. 3 is a dual stage inflator in which the inflator can be actuated to two or more different states for controlling the amount and pressure of gases expelled. It is sometimes desirable to alter the amount and pressure of the expelled gas to effect the inflation force of the air bag. For example, if sensor (not shown) detect that a child or smaller adult are seated in the passenger seat adjacent the air bag inflator assembly 14, it would be desirable to lower the inflation force of the air bag 32. With the two separate chambers 44 and 46, the inflator 26 can be actuated to generally three different stages corresponding to different inflation forces of the air bag 32. For example, for a lower power deployment, the propellant within the chamber 44 can be energized to excite the release of gas from the propellant. The air bag 32 is only inflated for a relatively short duration of time before the gases escape through vents formed through the air bag 32. It is preferred that after the air bag inflation event has generally ended, the propellant in the other chamber 46 is later ignited, such as about 120 milliseconds thereafter. This second ignition removes live propellant from the inflator 26. For a medium power deployment, the propellant within the chamber 44 is energized to excite the release of gas from the propellant, and then in a much shorter duration of time, such as about 17 milliseconds, the propellant within the chamber 46 is ignited. For an even more powerful deployment, the second propellant within the chamber 46 can be ignited at an even earlier duration of time, such as about 3 milliseconds.

Figure 4:
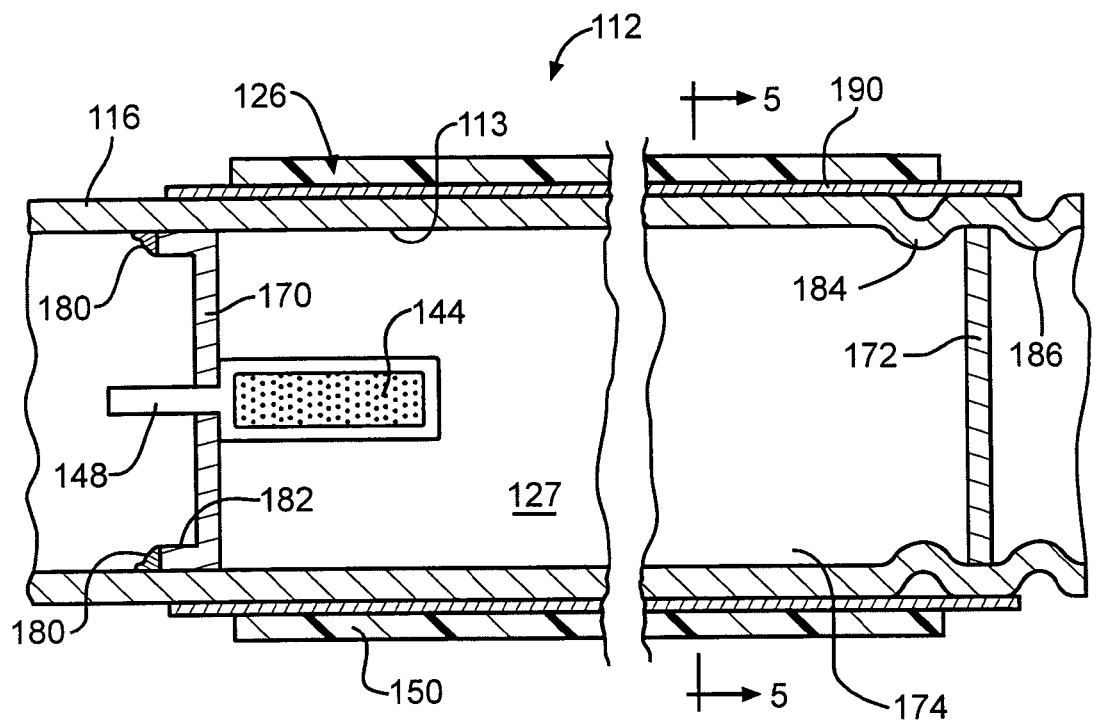
FIG. 4 is cross sectional view of a second embodiment of a cross car beam assembly in accordance with the present invention.
Figure 5:
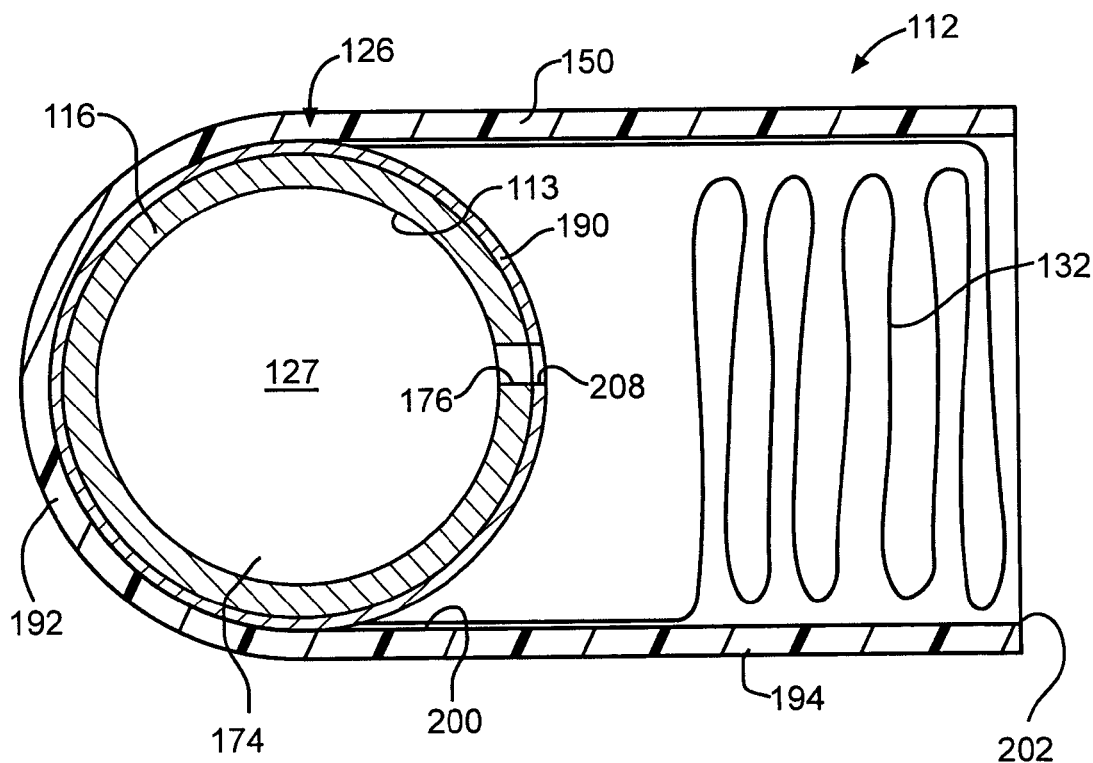
FIG. 5 is a sectional view of the cross car beam assembly taken along lines 4—4 of FIG. 4.

There is illustrated in FIGS. 4 and 5 an alternate embodiment of a cross car beam assembly, indicated generally at 112. Some of the structures and features of the assembly 112 are similar to the assembly shown and described with respect to FIGS. 1 through 3 above, and therefore similar components are indicated by similar reference numbers in these Figures, but with those of FIGS. 4 and 5 having one-hundred prefixes.

The assembly 112 includes an elongated hollow beam 116 having a generally tubular and circular cross section. The tubular beam 116 can be formed from an extrusion process or by rolling and welding processes. Preferably, the beam 116 has a constant cross-sectional shape along the length of the beam 116. However, it is not required that the beam 115 have a continuous constant cross-sectional shape during its entire length.

The cross car beam assembly 112 does not include a separate inflator having an outer housing and sleeve as described above with respect to the inflator 26. Instead, the assembly 112 includes an inflator assembly, indicated generally at 126, wherein the inflator assembly 126 is integrally formed in the cross beam 116. A wall portion 113 of the beam 116 defines the walls of the inflator assembly 126, thereby replacing the outer housing and sleeve of the separate inflator assembly 126. Thus, the interior 127 of the beam 116 houses a source of pressurized gases, such as a propellant cartridge or chamber 144 and initiators 148 which are electrically connected to a controller (not shown) for actuation and energizing of the inflator assembly 126 the propellant. It should be understood that any suitable source of pressurized gas can be used for an air bag inflator, as discussed above with respect to the inflator 26. To close off the interior of the beam 116, the inflator assembly 126 can include a pair of caps or walls 170 and 172. Preferably, the perimeter edges of the walls 170 and 172 are substantially sealingly attached to the interior wall portions 113 to define a generally enclosed chamber 174 within the interior 127 of the beam 116. However, a completely sealed chamber 174 is not required. Preferably, openings 176 are formed through the beam 116 to permit the flow of gases from the inflator assembly 126 to an air bag, schematically indicated at 132.

The walls 170 and 172 can be any suitable structure which closes off an end of the interior 127 of the beam 116. For example, the walls 170 and 172 can be separate plates having a shape generally corresponding to the cross sectional shape of the interior of the beam 116. The walls 170 and 172 may be attached to the beam 116 by any suitable manner. The walls 170 and 172 of the embodiment shown in FIG. 4 illustrate two examples of attaching the walls 170 and 172 to the beam 116. The wall 170 is attached to the interior wall 113 of the beam 116 by a weld 180. The weld 180 can be annular about the entire perimeter of the wall 170 or can be multiple spaced apart spot welds thereabout the perimeter of the wall 170. The wall 170 can be a relatively flat disk shape or can include an annular tube shaped extension 182, as shown in FIG. 5. Alternatively, the wall 172 can be fastened to the beam 116 by a pair of annular crimps 184 and 186 which are formed in the wall of the beam 116. The wall 172 is trapped by the crimps 184 and 186 and prevents axial movement of the wall 172 relative to the beam 116. The crimps 184 and/or 186 can be annular about the entire perimeter of the wall 172 or can be multiple spaced apart crimps thereabout. Of course, the walls 170 and 172 can be attached to the beam by any combination of welds and crimps. Alternatively, a wall can be attached to the beam by fasteners (not shown), such as threaded fasteners, extending through openings formed through the walls of the beam 116.

The cross car beam assembly 112 may also include an optional strengthening member, such as defined by a sleeve 190. The sleeve 190 is attached to beam 116 adjacent the inflator assembly 126 to provide added strength to the beam 116. The sleeve 190 can be attached to the outer surface of the beam 116, as shown in FIGS. 4 and 5, or can be attached to the inner surface, thereby defining a portion of the inflator assembly 126. The sleeve 190 generally provides for an increased thickness of the beam 116 at the region adjacent the inflator assembly 126, without altering the cross-sectional shape of the beam 116.

A folded portion of the air bag 132 can be disposed at a spaced apart relationship to the beam 116, as shown in FIG. 5. To direct the flow of gases from the inflator assembly 126, the cross car beam assembly 112 can include a chute 150. Note that the chute 150 is mounted on the beam 116 differently than the mounting of the chute 50 to the beam 16 of FIG. 2.

Referring to FIG. 5, the chute 150 includes a semi-cylindrical portion 192 which is disposed over the beam 116 and sleeve 190. An extension 194 extends from the portion 192 and houses the air bag 132. As best shown schematically in FIG. 5, a left-hand portion 200 of the air bag 132 is disposed over the left-hand portion of the beam 116 and the sleeve 190. The chute 150 covers the portion 200. The portion 200 includes openings (not shown) through which the beam 116 and the sleeve 190 laterally extend. Preferably, the portion 200 is substantially sealingly engaged with the beam 116 and/or the sleeve 190. The cross car beam assembly 112 can be pre-assembled and packaged and installed as one unit when installed into the vehicle or an instrument panel. A door (not shown), similar in function and/or structure as the door 56 described above, can cover an opening 202 of the chute 150.

The inflator assembly 126 operates in a similar manner as the inflator assembly 26 described above. Upon detection of an impact condition in which the air bag 132 is to be deployed, a controller energize the initiator 148, which in turn energizes the propellant within the respective chamber 144. Excitation of the propellant causes an expansion of gas within the chamber 174 of the inflator assembly 126 defined by the wall portion 113 of the beam 116 and the walls 170 and 172. The gases are then forced through one or more of the openings 176 formed through the beam 116 and one or more openings 208 formed through the sleeve 190. The expanded gases are then directed into the interior of the air bag 132, thereby causing the air bag 132 to unfold and deploy.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A cross beam assembly comprising:

an air bag expandable from a folded condition to an expanded condition;

a beam having a hollow interior, said beam defining an opening formed therein;

an inflator assembly including a source of pressurized gas for inflating said air bag, said inflator assembly disposed within the hollow interior of said beam, such that activation of said inflator assembly expels gas through said opening, wherein said inflator assembly is integrally formed in said beam such that a portion of said beam defines walls of said inflator assembly, and wherein said beam includes a strengthening member defining a sleeve which is disposed over said beam and attached thereto, said strengthening member attached to a portion of said beam adjacent to said inflator; and a chute connected to said beam, said chute having a passageway in communication with said opening formed in said beam, said chute extending outwardly from said beam for directing expelled gas from said source of pressurized gas to said air bag upon actuation of said inflator assembly, wherein said air bag is disposed in said chute when in the folded condition.

2. The assembly of claim 1, wherein said beam has a generally constant cross-sectional area along substantially the entire length of the beam.

3. The assembly of claim 1, wherein said cross beam includes a pair of walls disposed in said hollow interior of said beam, and wherein said walls and said hollow interior of said beam define a chamber for housing said source of pressurized gas.

4. The assembly of claim 3, wherein one of said walls is attached to said beam by a crimp formed in said beam.

5. The assembly of claim 3, wherein one of said walls is attached to said beam by a weld.

6. The assembly of claim 1, wherein said chute partially surrounds said beam.

7. The assembly of claim 1 further including a door for covering said air bag in a non-deployed state, said door movable to deployed position upon actuation of said inflator to inflate said air bag, wherein said door is attached to said chute.

8. The assembly of claim 7, wherein said door is integrally formed with said chute.

9. The assembly of claim 1, wherein said source of pressurized gas is a solid propellant.

10. A cross beam assembly comprising:
an air bag expandable from a folded condition to an expanded condition;
a beam having a hollow interior, said beam defining an opening formed therein;
an inflator assembly including a source of pressurized gas for inflating said air bag, said inflator assembly disposed within the hollow interior of said beam, such that activation of said inflator assembly expels gas through said opening, wherein said inflator assembly is integrally formed in said beam such that a portion of the beam defines walls of said inflator assembly containing the source of pressurized gas, wherein said beam includes a strengthening member defining a sleeve which is disposed over said beam and attached thereto, said strengthening member attached to a portion of said beam adjacent to said inflator assembly;
a chute connected to said beam, said chute having a passageway in communication with said opening formed in said beam, said chute extending outwardly from said beam for directing expelled gas from said source of pressurized gas to said air bag upon actuation of said inflator assembly, wherein said air bag is disposed in said chute when in its folded condition; and
a door for covering said air bag when in its folded condition in said chute, said door being integrally formed with said chute, said door being movable to a deployed position upon actuation of said inflator to inflate said air bag.

* * * * *